United States Patent [19]

Wells

[11] Patent Number: 5,047,995
[45] Date of Patent: Sep. 10, 1991

[54] DETECTION OF MOVING OBJECTS

[75] Inventor: Howard J. Wells, Worcestershire, England

[73] Assignee: The Secretary of State for Defence in Her Britannic Majesty's Government of the United Kingdom of Great Britain and Northern Ireland, London, England

[21] Appl. No.: 222,404

[22] Filed: Dec. 19, 1980

[30] Foreign Application Priority Data

Jan. 17, 1980 [GB] United Kingdom ................. 8001463

[51] Int. Cl.⁵ ............................................. G01S 3/80
[52] U.S. Cl. .................................. 367/125; 367/135; 367/136; 340/566
[58] Field of Search ............... 367/125, 117, 135, 136; 340/566

[56] References Cited

U.S. PATENT DOCUMENTS

| | | | |
|---|---|---|---|
| 3,205,438 | 9/1965 | Buck | 367/125 |
| 3,348,195 | 10/1967 | Spandock | 367/125 |
| 3,824,532 | 7/1974 | Vandierendonck | 367/136 |
| 4,005,384 | 1/1977 | Pryor, Jr. et al. | 340/566 |
| 4,279,027 | 7/1981 | Van Sloun | 367/125 |

Primary Examiner—Daniel T. Pihulic
Attorney, Agent, or Firm—Pollock, Vande Sande and Priddy

[57] ABSTRACT

A detector system having a channel for comparing the peak amplitude of at least one of two electrical signals, produced at the output of two spaced geophones, against an amplitude threshold, to produce an indication of a moving object when this threshold is exceeded. To reduce the number of false indications, the system includes a parallel channel for measuring the phase difference between the two signals, and a processing circuit responsive to both channels, to ensure that indication is allowed only when the measured phase difference changes sense. The parallel channel includes four flip-flops each to measure the phase difference and the outputs of these flip-flops are added together, to produce a phase dependent signal for controlling the processing circuit. Further discrimination is provided by timing the phase transition, a time gate being used to inhibit indication when the phase transition does not occur within prescribed time limits. The processing circuit also includes a memory circuit for comparing successive phase transitions. This memory circuit resolves transitions following in close succession and inhibits when intermediate phase transition of opposite sense occur, thus allowing resolution of close moving objects. The sense of the phase transition is used for indication of direction of transit.

12 Claims, 6 Drawing Sheets

DETECTION OF MOVING OBJECTS

The present invention concerns the detection of moving objects particularly by seismic systems with facility for classifying vehicles both according to type e.g. wheeled, light- or heavy-tracked type vehicles and, according to direction of transit.

A system for detecting and classifying moving vehicles is described in Pykett U.S. patent application Ser. No. 116,343 filed Jan. 7, 1980, for "Detection of Moving Objects". In that system, two parallel amplitude sensitive channels are employed to compare the peak amplitudes of a geophone signal against each of two amplitude thresholds for distinguishing signals that are characteristic of wheeled vehicles from signals characteristic of tracked vehicles. The two amplitude sensitive channels are combined with a third channel which has provision for monitoring the duration of amplitude signals and of inhibiting indication for signals of too short a duration. The use of this duration channel thus allows rejection of false signals resulting from impulses—e.g. gunshot or other noise. The information that this system provides is independent of vehicle transit direction. Also, since detection in this manner is dependent only upon simple measures of signal amplitude, the ability of this system to resolve individual vehicles moving in convoy, is limited. A further problem is introduced by intermittent fading of the detected seismic vibrations. This effect may give rise to multiple indication of a single moving vehicle.

Linear arrays of seismic vibration sensors, (i.e. geophones), connected alternately to two different circuits, have been used as a means of limiting the sensitivity of an alarm system so that it responds only to intrusion in a localized region. See UK Patent Serial No. 1,246,264.

According to a first aspect of the present invention there is provided a system for the detection of moving objects, the system comprising:

a phase-sensitive circuit, responsive to two electrical input signals, for deriving a phase-sense signal that is related to the relative phase difference between these input signals;

an amplitude-sensitive circuit, responsive to at least one of the two electrical input signals, for comparing the peak amplitude of at least this one input signal against a first amplitude threshold of magnitude predetermined so to distinguish between electrical signals, that are characteristic of at least one class of moving object, from other electrical signals, and for deriving a first amplitude-threshold signal that is dependent on the outcome of this first comparison; and, a processing circuit connected to both the phase-sensitive circuit to receive the phase-sense signal, and the amplitude-sensitive circuit to receive the amplitude-threshold signal, for providing an output signal indicating the detection of a moving object if, while said first amplitude threshold is exceeded, the phase-sense signal changes corresponding to a change in lead-lag phase relationship between the two electrical input signals.

Hereafter, this system is referred to as "the system first defined."

In the above system first defined, any changes of the phase-sense signal that occur while said first amplitude threshold is not exceeded, do not result in the indication of a moving object. The false alarm rate is thus reduced in comparison to systems where there is no mutual interaction introduced between phase-sensitive and amplitude sensitive circuits. Further reduction in false alarm rate may be achieved by use of an adaptive threshold—i.e. a threshold that is not fixed but is slow in following changes in signal amplitude.

It is preferable that the amplitude sensitive circuit is responsive to both of the electrical input signals. The amplitude-sensitive circuit may thus include means for summing the two electrical input signals and means for comparing the resultant summed signal against the first amplitude threshold.

The phase-sense signal, that is derived during operation of the phase-sensitive circuit, may be a two-valued signal, the state of which depends on the sign only of the relative phase difference between the two input signals so to distinguish between a lead and a lag phase relationship between these signals.

It is preferable, however, that the magnitude of the phase-sense signal should reflect the degree of coherence of the two input signals and its sign should depend on the sense of the relative phase difference of these signals and that the processing circuit is adapted to process this phase-sense signal so to reject those changes of the phase-sense signal that are not characteristic of the pass of a moving object. Thus, the processing circuit may include: comparator means for comparing this phase-sense signal with each of two threshold levels; and, time-gating means for inhibiting indication of a moving object if said two phase-sense signal threshold levels are not crossed consecutively within an interval of time predetermined to distinguish those changes of the phase-sense signal that are characteristic of the pass of a moving object, from other changes of the phase-sense signal.

It is a consequence of the above system that in the presence of a convoy of moving vehicles changes of the phase-sense signal must occur not only during the pass of each vehicle but also between the passes of the vehicles. These latter changes in the phase-sense signal may satisfy the above time and amplitude criterion but will be of the opposite sense to those which result from the passes of the vehicles. Thus to allow rejection of these consequential changes and to enable separate detection of each moving object passing in close succession, it is preferable that the processing circuit also includes a memory circuit both for following successive changes of the phase-sense signal of like sense, and, for rejecting intermediate changes of the phase-sense signal of opposite sense.

The input signals, utilized by the system, may be derived from two external geophones which each respond to the seismic vibrations generated by moving objects. The system may thus include a phase-sensitive circuit that is responsive to these derived signals, having, therefore, two matched band-pass filters, one responsive to each electrical signal, and both defining a common pass-band lying in the seismic vibration spectrum. When the two geophones are deployed, to avoid ambiguity, it is important that they are separated by a distance not greater than one half of the upper-band wavelength.

According to a second aspect of the present invention there is provided a system for the detection and classification of moving objects comprising the system first defined, wherein: the amplitude-sensitive circuit includes means for comparing the peak amplitude of at least one of the input signals against a second amplitude threshold of magnitude predetermined so to distinguish between electrical signals that are characteristic of the one class of moving object from electrical signals that are characteristic of another class of moving object, which latter signals attain a higher maximum peak amplitude, and for deriving a second amplitude-threshold signal that is dependent on the outcome of this second comparison; and, the processing circuit includes means for sampling both first and second amplitude-threshold signals, or, one or more signals logically derived therefrom, at a time synchronized with the change of the phase-sense signal characteristic of the pass of a moving object, and means responsive to such sampled signals for providing classification of moving objects.

Preferably the phase-sensitive circuit includes analogue means for deriving a phase-sense signal whose magnitude reflects the degree of coherence of the two input signals and whose sign is dependent on the sense of the relative phase difference of the two input signals, and the processing circuit includes comparator means for comparing the phase-sense signal with two threshold levels, the sampling being synchronized to occur during the change of the phase-sense signal as soon as both phase-sense signal threshold levels have been crossed.

The first and second amplitude-thresholds may be predetermined so to distinguish between electrical signals that are characteristic of moving wheeled vehicles, and electrical signals that are characteristic of tracked vehicles.

In addition the amplitude-sensitive circuit may include further means for comparing peak amplitude against another amplitude threshold and so may distinguish between signals having the characteristics of, for example, light, and, heavy, tracked vehicles.

According to a third aspect of the present invention there is provided a directional system for the detection of moving objects comprising the system first defined wherein the processing circuit includes direction sensitive means responsive to the phase-sense signal, for deriving at least one directional signal dependent on the sense of change of the phase-sense signal corresponding to a change in the lead-lag phase relationship between the two input signals.

In particular, the phase-sensitive circuit may include the analogue means, and the processing circuit the comparator means, the sense of change of the phase-sense signal being determined from the order in which the two phase-sense signal threshold levels are crossed.

The directional signal may be used to control a display. Alternatively it may be used in a selective system that is used to monitor one-way movement to the exclusion of movement in the opposite direction.

Embodiments of the invention will now be described, by way of example only, with reference to the accompanying drawings, of which.

Figure 1:
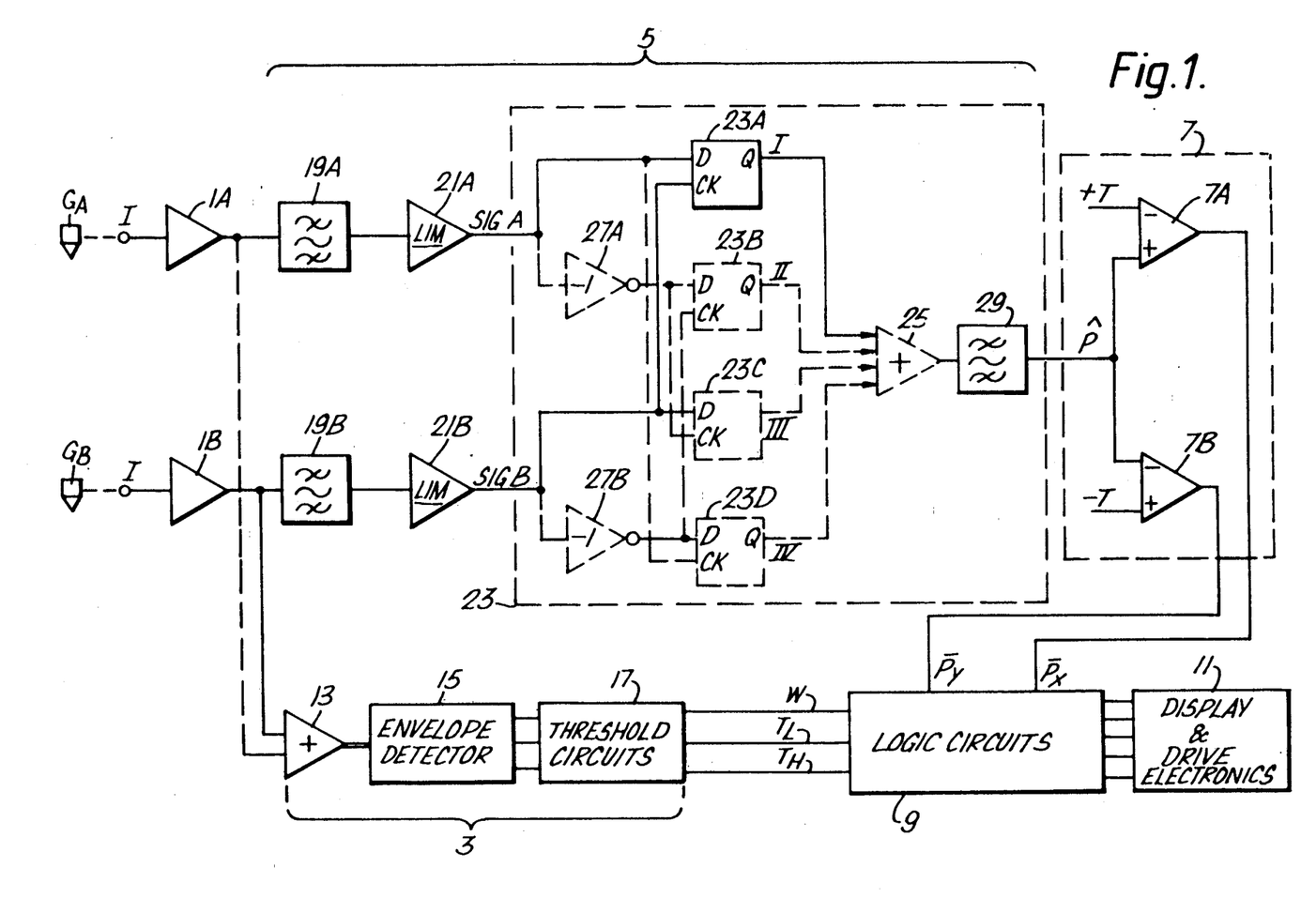
FIG. 1: is a block diagram of a directional seismic sensor system embodying features of the invention.

In the directional seismic sensor system shown in FIG. 1, pre-amplified electrical response signals, produced by a pair of geophones $G_A$ and $G_B$ and head amplifiers 1A and 1B, one connected to each geophone, are processed by two parallel circuits, an amplitude-sensitive circuit 3 and a phase-sensitive circuit 5. In the preferred construction shown, a continuous phase-sense signal P derived by the phase sensitive circuit 5 is compared with two amplitude thresholds $\pm T$ in comparator circuitry 7 and two phase threshold logic signals $\overline{P}x$, $\overline{P}y$ are derived, the logic value of these signals depending on whether the amplitude of the phase-sense signal P lies above or below these thresholds $\pm T$. These logic signals $\overline{P}x$, $\overline{P}y$, together with other logic signals W, $T_L$ and $T_H$ derived by the amplitude-sensitive circuit 3, are utilized by logic circuitry 9 and through this, drive an indicator display by means of drive electronics 11 controlled by the logic circuitry 9. The display provides indication both of vehicle direction (i.e. left to right, or, right to left, along the route) and of vehicle class (i.e. wheeled, light tracked or heavy tracked).

While sufficient information for the classification of vehicles, according to signal amplitude, may be derived by connection of the amplitude-sensitive circuitry 3 to a single one of the two geophones $G_A$ and $G_B$, it proves advantageous to utilize information from both. In the preferred amplitude-sensitive circuit 3' shown in FIG. 2, the two preamplified signals are summed in a further amplifier stage 13. The signals, after amplification, are envelope detected in a detector stage 15 and then classified according to peak amplitude by means of threshold circuitry 17 which is used to derive the logic signals W, $T_L$ and $T_H$. Since the envelope signal, detected in the detector stage 15, results from summed signals, the resolution, that it affords, is marginally improved.

Figure 2:
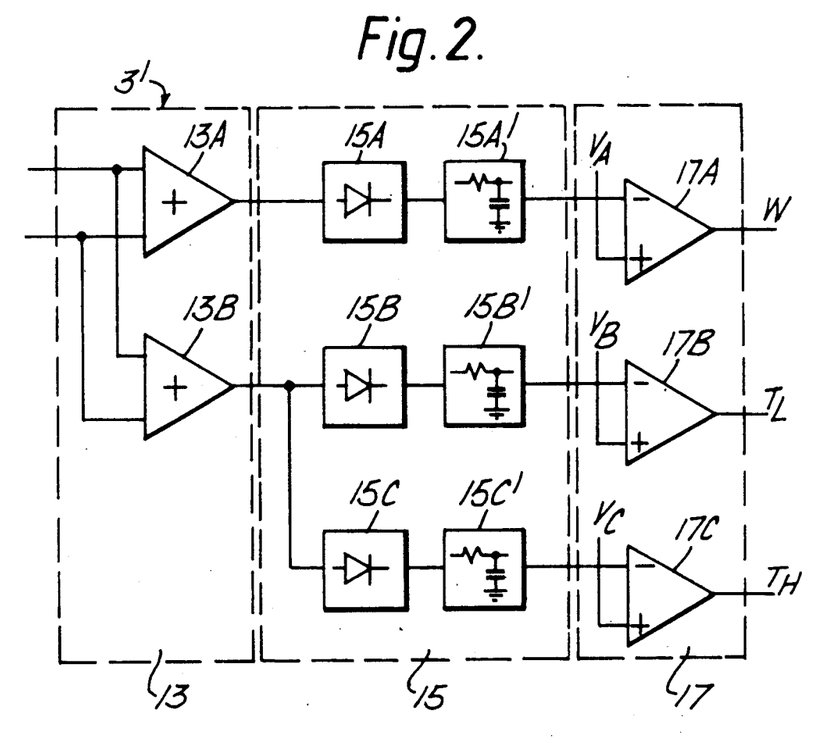
FIG. 2: is a diagram of signal amplitude detection and thresholding circuitry for the system shown in FIG. 1.

The amplifier stage 13 has to cope with a large dynamic range of signals—for these may correspond to vehicles of different class ranging from wheeled vehicles to light and heavy tracked vehicles. For this reason the preamplified signals feed two parallel summing amplifiers 13A and 13B of different gain. The first of these amplifiers 13A feeds a full-wave rectifier 15A and smoothing circuit 15A'. This full-wave rectifier 15A also provides further amplification gain, and the smoothed envelope detected signal provided at the output of the smoothing circuit 15A' is fed to the subtractive input of a difference amplifier 17A forming part of the threshold circuitry 17. The second of these amplifiers 13B feeds two parallel lines, each line including a full-wave rectifier 15B, 15C, a smoothing circuit 15B', 15C' and a difference amplifier 17B, 17C. The additive input of each difference amplifier 17A, 17B and 17C is connected to an adaptive threshold voltage source $V_A$, $V_B$, $V_C$.

Each difference amplifier 17A, 17B, and 17C is connected with feedback so that each amplifier is switched into one of two states—hard-on or hard-off thus providing logic level signals 'Hi' or 'Lo'. Each amplitude threshold logic signal W, $T_L$ or $T_H$ switches from logic 'Hi' to logic 'Lo' when the amplitude of the envelope detected signal on a corresponding one of the lines increases above the level of the corresponding reference voltage. The line gain—i.e. the accumulative gain contributed both by the amplifiers 13A, or 13B and the rectifier 15A, 15B or 15C is set, in each case, and the reference voltages determined, to define a different threshold level $V_W$, $V_{TL}$, $V_{TH}$ referred to the inputs I of preamplifiers 1A, 1B. The lowest of these threshold levels, $V_W$, is set to distinguish both wheeled and tracked vehicles from sources of seismic signals of lower amplitude. The intermediate of the threshold levels $V_{TL}$ is set to distinguish tracked vehicles from wheeled vehicles, and the highest level $V_{TH}$ is set to distinguish heavy tracked vehicles from other tracked vehicles which produce, at envelope maximum, seismic signals of lower peak amplitude. Using moving-coil geophones of sensitivity 0.7 v/in/s (1.8 v/cm/s) deployed 2 m to the side of the route, and head amplifiers with approximately 30 dB gain, threshold levels, referred to the amplifiers inputs I of value 320 mVpp ($V_W$), 3 mVpp ($V_{TL}$), and 30 mVpp ($V_{TH}$) have been found suitable.

The phase sensitive circuit 5 receives the two preamplified geophone signals at the input ports of two matched, parallel, band-pass filter circuits 19A and 19B. Each filter circuit 19A and 19B comprises low and high pass second order Butterworth filters which limit the band-width to between 20 Hz and 70 Hz, the high pass stage incorporating a further 20 dB gain. While this causes limiting of some signals that correspond to the transit of tracked vehicles, this is of no consequence since the low frequency content of such signal, is never dominant and it is more important that the limiter stages 21A, 21B which follow the filter circuits 19A, 19B should work effectively with small amplitude input signals.

The limited signals produced at the output ports of the limiters 21A, 21B, signals A and B respectively, are processed, to provide the phase-sense signal P by sensing circuitry 23. This sensing circuitry 23 includes a positive edge triggered flip-flop 23A. The limited signals, A and B, are fed to the data 'D' and clock 'CK' input ports of this flip-flop. One of these limited signals, signal A, is latched at the positive-going zero-crossing of the other, signal B, and the signal produced at the output Q of the positive edge triggered flip-flop 23A has a state dependent on the sign of the relative phase difference between these limited signals.

In general, it is found that the signals from the geophones are not pure sinusoids and that this results in measurable noise in the resultant phase-sense signal.

In the preferred arrangement shown in broken outline in FIG. 1, the limited signals A and B provided at the output of each limiter 21A and 21B are also correlated by three additional flip-flops 23B, 23C and 23D and summed by connecting these flip-flops and flip-flop 23A, to the inputs of a summing amplifier 25. The output of limiter 21A is connected to the data input D of flip-flop 23A, and to the clocking input CK of flip-flop 23D. It is also connected, via an inverter 27A, to the data input D of flip-flop 23B and to the clocking input CK of flip-flop 23C. The output of the other limiter 21B is connected to the data input D of flip-flop 23C and to the clocking input CK of flip-flop 23A. It is also connected, via another inverter 27B, to the data input D of flip-flop 23D and to the clocking input CK of flip-flop 23B.

Figure 4:
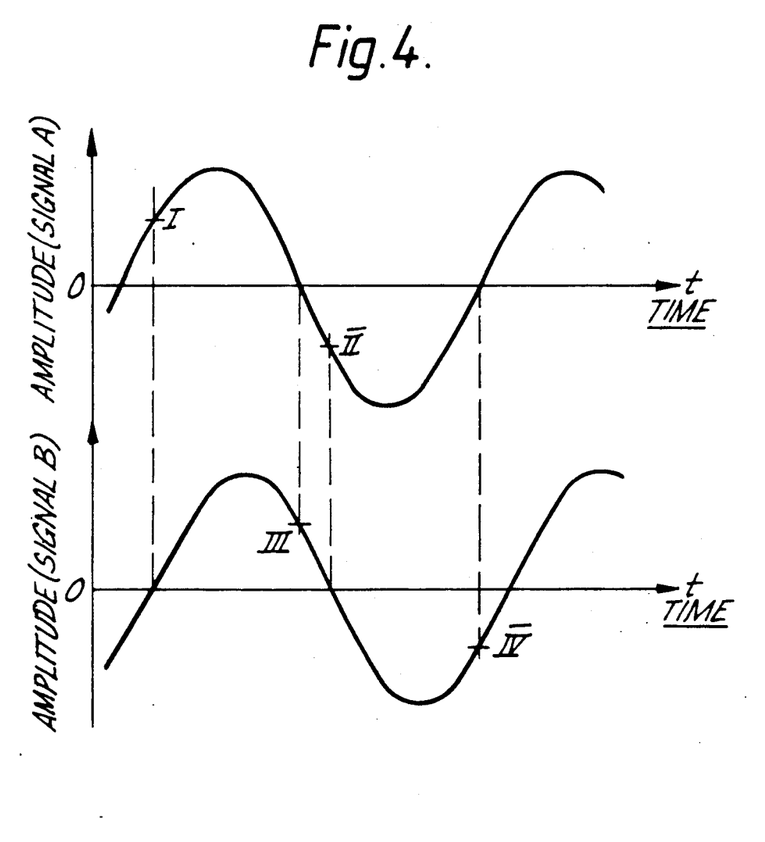
FIG. 4: shows two signal waveforms to illustrate correlation sampling provided in the system shown in FIG. 1.
Figure 5:
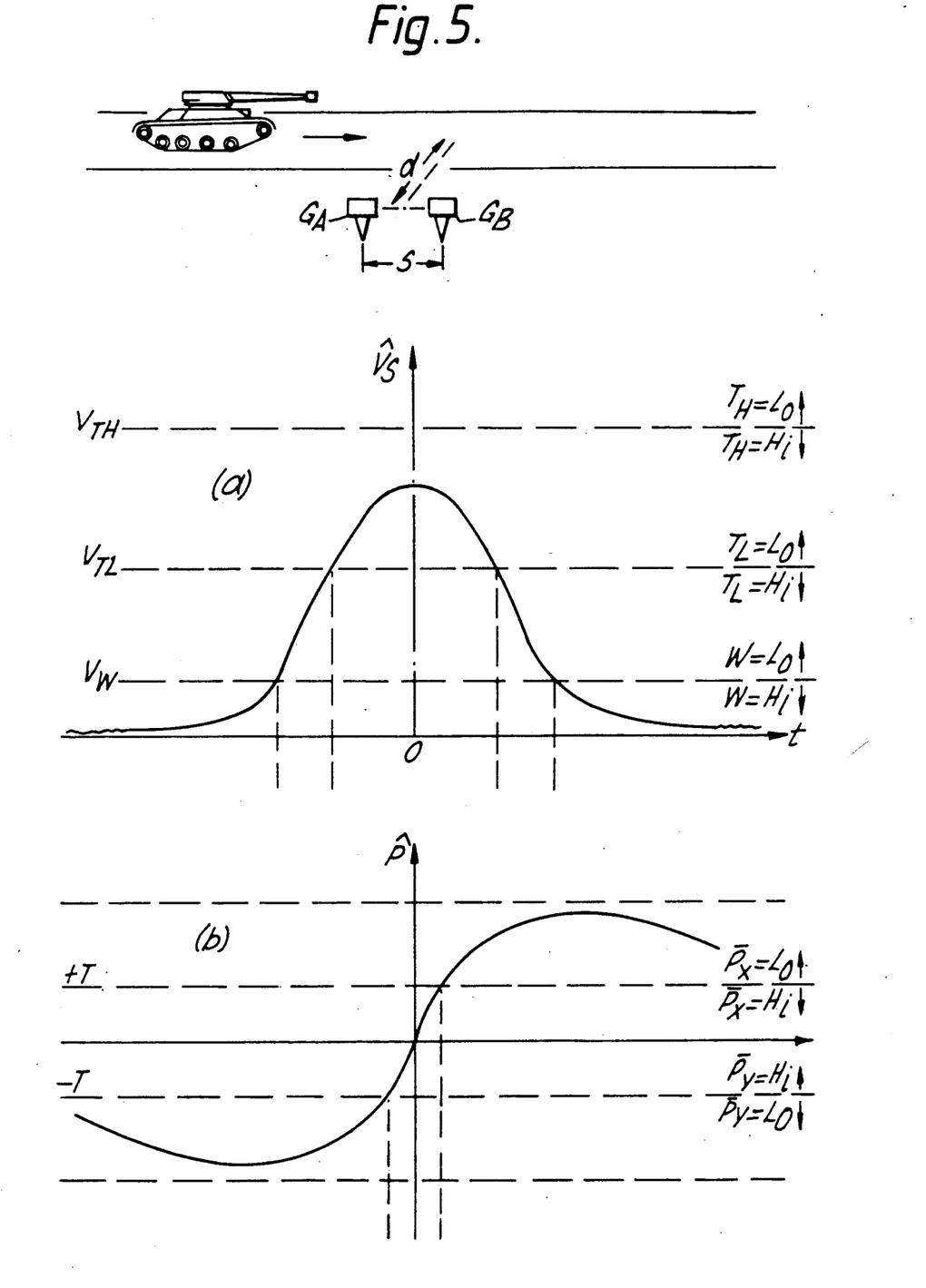
FIGS. 5(a) and 5(b): are illustrative amplitude-time graphs showing, respectively, the variation of sensed signal peak amplitude Vs, and, the variation of amplitude P of a phase-sense signal derived in the system shown in FIG. 1, these signals corresponding to the transit of a light tracked vehicle travelling from left to right along a route adjacent to two detecting geophones connected to the system; and, FIGS. 6(a) to 6(l): show the form of logic signals derived during operation of the system shown in FIGS. 1 to 3.
Figure 6:
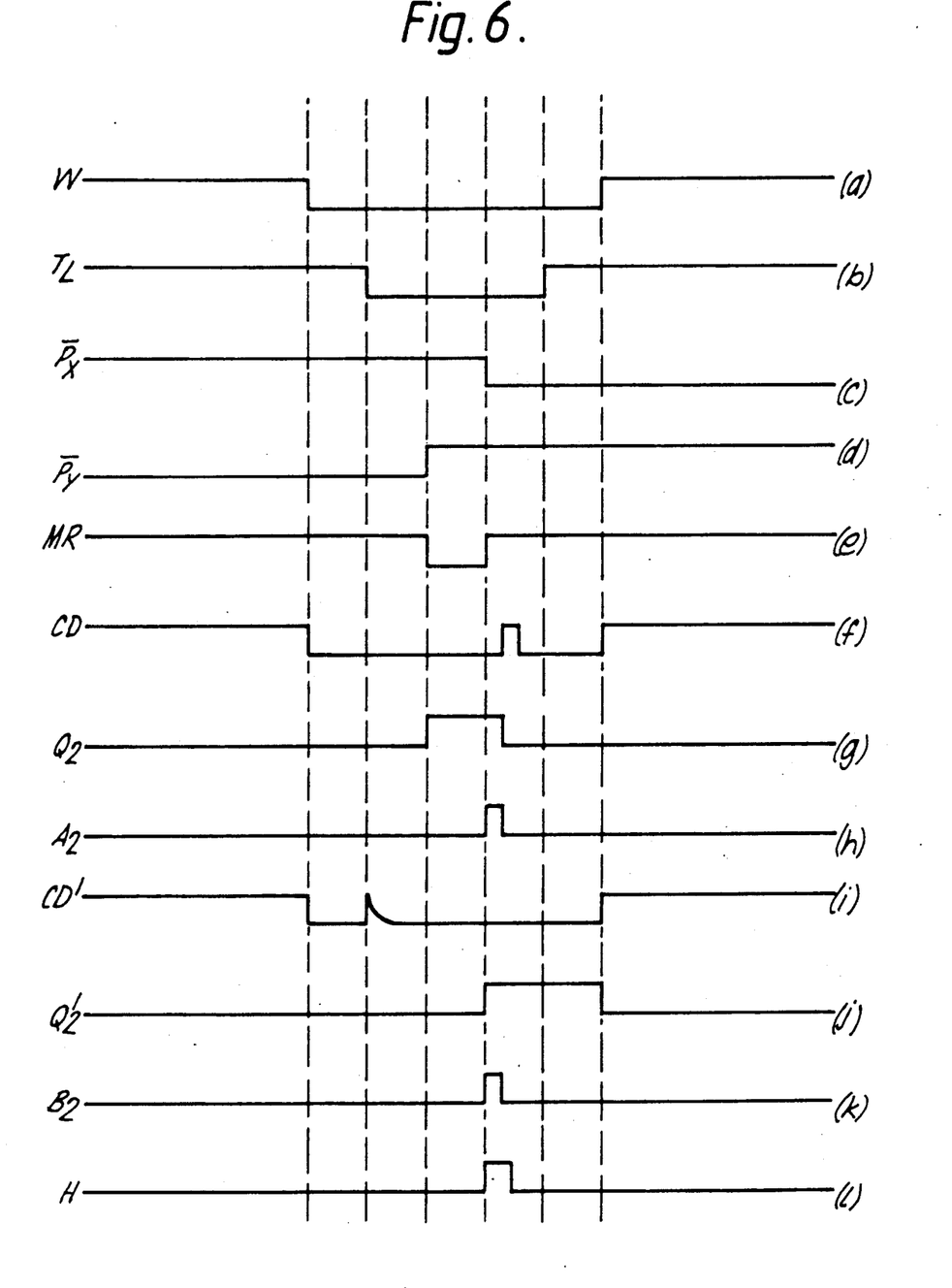

As shown in FIG. 4, four correlation samples I to IV. of the limited signals A and B are provided by this arrangement, and any noise that is uncorrelated between these samples, is reduced by summation. Signal A is latched at the positive-going zero-crossing (Sample I), and its inverse at the negative-going zero-crossing (Sample II), of signal B. Signal B is latched at the negative-going zero-crossing (Sample III), and its inverse at the positive-going zero-crossing (Sample IV), of signal A.

Further smoothing is provided by a smoothing circuit 29. This circuit here incorporates a second order low pass Butterworth filter with a chosen bandwidth of about 0.7 Hz. This is used in preference to a simple RC integration circuit, as it is more effective at reducing step-like noise in the signal. A smoothed, quasi-continuous phase-sense signal P is thus produced at the output of the smoothing circuit 29.

The phase threshold logic signals $\overline{P}x$, and $\overline{P}y$, are derived from the phase-sense signal P by means of comparative circuitry 7. This comprises two difference amplifiers 7A, 7B and, responsive to each of these, a Schmitt trigger (not shown explicitly). Each Schmitt trigger is included so that changes in logic level result in well defined voltage edges, these latter being required for effective triggering of the logic circuitry 9. The phase-sense signal P is applied to the additive input of the first of these difference amplifiers 7A and a reference voltage $+T$ applied to the subtractive input. The logic signal $\overline{P}x$ changes from logic state Hi to logic state Lo when the amplitude of the phase signal P falls below the level of the reference voltage $+T$. The phase-sense signal P is also applied to the subtractive input of the other difference amplifier 7B and the inverse of the reference voltage, $-T$, is applied to the additive input. The logic signal $\overline{P}y$, produced at the output of this amplifier 7B, changes from logic state Hi to logic state Lo when the amplitude of the phase signal rises above the threshold level $-T$.

The order in which the logic level of signals $\overline{P}x$ and $\overline{P}y$ changes, is monitored by the logic circuitry 9 and utilized to indicate vehicle direction. Spurious phase transitions also occur, however, and these need to be rejected to reduce the false alarm rates that would result if this information alone were utilized. Spurious transitions have been found to occur for distant moving tracked vehicles—where signal phase can be affected by propagation through non-homogenous terrain. However, the phase-sense signal transitions that arise due to terrain inhomogeneity are generally slow, and with time thresholding applied by the logic circuitry 9, transitions of too long a duration are rejected. False alarm rejection is also enhanced by inhibiting direction indication so that direction information is only utilized while the signal amplitude is above the lowest amplitude adaptive threshold $V_W$, when in the usual case the vehicle monitored is in reasonably close proximity to the two geophones $G_A$ and $G_B$.

Figure 3:
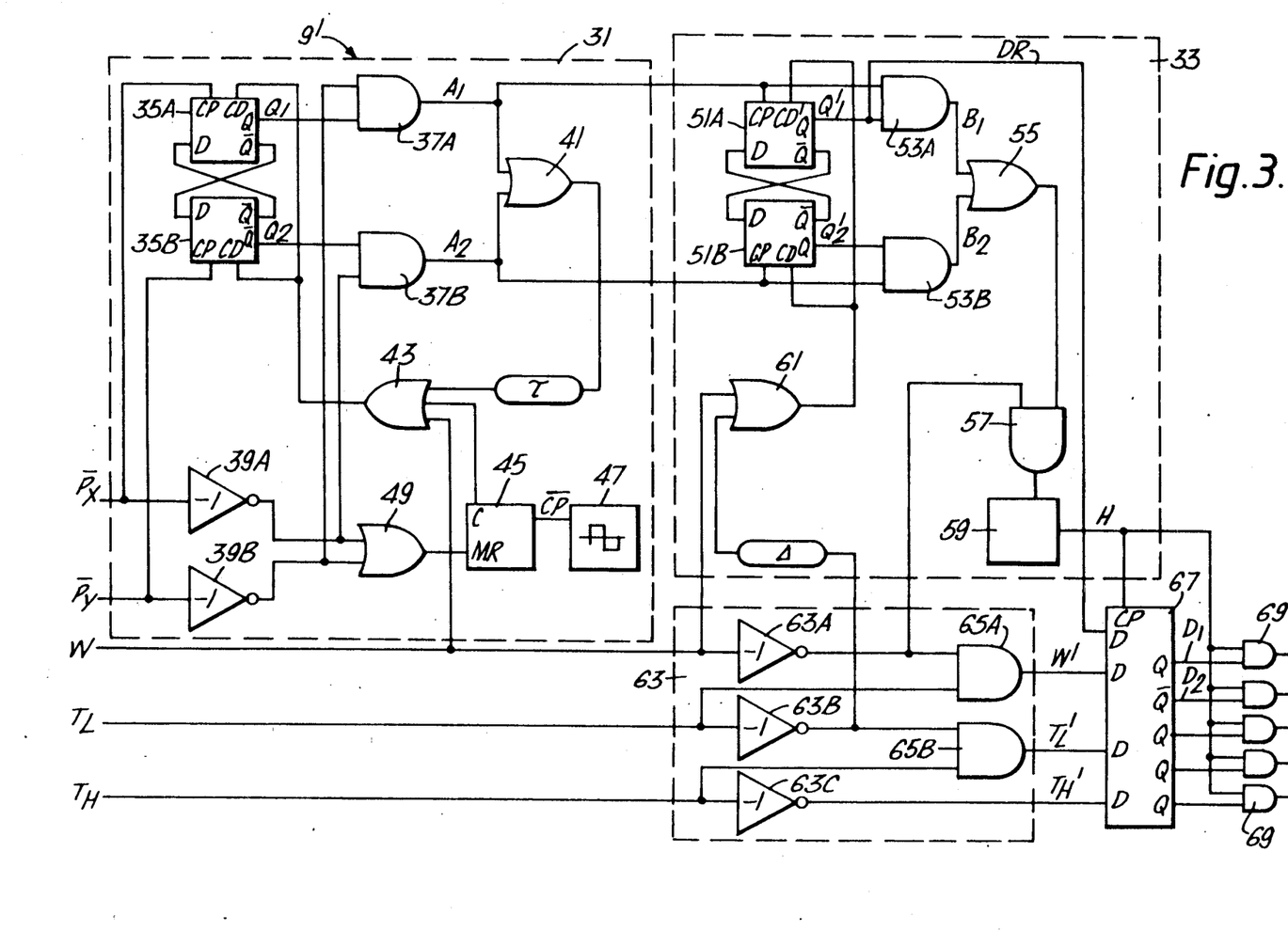
FIG. 3: is a diagram of logic circuitry for the system shown in FIG. 1.

In the logic circuitry 9', shown in FIG. 3, a direction logic signal LR and a validity signal H are produced by two logic stages 31, and 33. In the first of these stages 31, the phase threshold logic signals $\overline{P}x$ and $\overline{P}y$ provided at the outputs of the comparator circuitry 7 are introduced at the clocking inputs CP of a pair of cross-coupled edge-triggered flip-flops 35A and 35B. Provided that the reset inputs CD to these flip-flops are at logic Lo, one or other of the 'Q' outputs of these flip-flops—output lines $Q_1$ or $Q_2$—is driven Hi when one of the signals $\overline{P}x$, $\overline{P}y$ changes from Lo to Hi and a positive-going edge voltage is applied to one of the clocking inputs CP. These output lines $Q_1$ and $Q_2$ are each connected to an AND gate 37A, and 37B; respectively. Each of the AND gates 37A and 37B has another input connected to receive a different one of the signals $\overline{P}x$ and $\overline{P}y$, through inverters 39A and 39B. Each AND gate 37A and 37B is connected at its output to one of two first stage output lines $A_1$ and $A_2$, respectively. The arrangement is such that only one of these lines is driven to logic Hi when after a change in one of the signals $\overline{P}x$ or $\overline{P}y$ from Lo to Hi, the other signal $\overline{P}y$ or $\overline{P}x$ changes in the opposite manner. Both signal lines $A_1$ and $A_2$ are connected to the reset inputs CD of the two flip-flops 35A and 35B through a first OR gate 41, a reset delay circuit $\tau$ and a second OR gate 43. When successive changes of the logic signals $\overline{P}x$ and $\overline{P}y$ take place, a pulse is developed on one of the lines $A_1$ or $A_2$, the width of this pulse being determined in part by the delay in the reset delay circuit $\tau$.

In the reset state, both lines $A_1$ and $A_2$, and flip-flop outputs $Q_1$ and $Q_2$, are held Lo and further indication information is inhibited. The reset inputs CD of the two flip-flops 35A and 35B are also connected through the OR gate 43 to the logic signal W output of the threshold circuit 17. In consequence, indication information is also inhibited while the signal W is at logic Hi i.e. while the sensed signal Vs is below the lowest threshold level $V_W$ and all vehicles monitored are out of close range.

The reset inputs CD of the two flip-flops 35A and 35B are also connected through the OR gate 43 to the output C of a timing counter 45. This counter 45 is clocked by a pulse generator 47 and the reset input MR of this counter, which is active when held at logic Hi, is connected to the outputs of the inverters 39A, and 39B through an OR gate 49. The counter output C is held Lo while the counter is held in the reset state. When one or other of the logic sense signals $\overline{P}x$, $\overline{P}y$ is driven Hi, possibly indicating the close approach of a vehicle, the reset input MR goes Lo and the counter started. While the counter is in this state, and provided it is not again reset, the output C is held Lo until, after a predetermined time interval $\Delta t$ measured by a fixed number of pulse counts, it is driven Hi resetting the flip-flops 35A and 35B. In this manner, if the phase transition is of too long a duration, direction indication is inhibited. With the phase sense signal thresholds $\pm T$ set at 40% of phase-sense signal maximum, an interval $\Delta t$ of 2.5 seconds has been found to give adequate rejection of spurious signals.

The second logic stage 33 is introduced to facilitate the detection of individual vehicles travelling in convoy.

The second logic stage 33 comprises a second pair of cross-coupled edge-triggered flip-flops 51A and 51B, the clock inputs CP of which are connected to the output lines $A_1$ and $A_2$ of the first logic stage 31. The output ports Q of these flip-flops 51A and 51B are connected by lines $Q_1'$ and $Q_2'$ to AND gates 53A and 53B respectively. The output ports of these AND gates are connected by lines $B_1$ and $B_2$ to an OR gate 55 which is followed by a further AND gate 57 and a monostable 59. The other input of each AND gate 53A and 53B is connected to the output lines $A_1$ and $A_2$ of the first stage 31. The reset inputs CD of the flip-flops 51A and 51B are connected in parallel through an OR gate 61 to the logic signal W line, and, AND gate 57 is connected to this line through an inverter 63A.

The flip-flops 51A and 51B remember the sense of the first valid transition of the phase sense signal P which occurs after the wheeled threshold $V_W$ has been exceeded. During the passage of a convoy, and while the wheeled threshold $V_W$ is exceeded, the phase sense signal P may change state between vehicle passes. The flip-flops 51A and 51B are used to gate out any intervehicle transition of opposite sense which may occur between vehicle passes. A Hi level on one of the lines $B_1$ or $B_2$ signifies that a valid transition of the appropriate sense has occurred, and is used to trigger the monostable 59 to produce a validity signal pulse 'H', while the wheeled threshold is still exceeded. If the wheeled threshold is no longer exceeded, however, AND gate 57 is closed and no validity pulse generated.

It is also found that spurious phase signal transitions occasionally occur during the approach of tracked vehicles as the signal settles to the correct state. Such a transition would set the wrong state into flip-flop 51 and thus inhibit detection of the vehicle. To prevent this occurrence, the reset inputs CD of flip-flops 51A and 51B are also connected through OR gate 61 to a differentiation circuit $\Delta$ which receives input from the logic signal $T_L$ through an inverter 63B. The flip-flops, 51A and 51B, are reset as the tracked threshold $V_{TL}$ is exceeded and the reset inputs CD are pulsed. Thereafter the flip-flops 51A and 51B remember the sense of the true transition of the phase sense signal P.

One of the Q outputs of the flip-flops 51A and 51B is used to provide the direction logic signal 'LR'.

The direction logic signal 'LR', the validity signal 'H', and the amplitude-threshold logic signals W, $T_L$, and $T_H$ are used to initiate an indicator display.

The amplitude-threshold logic signals W, $T_L$ and $T_H$ are first processed by logic circuitry 63 to provide classification logic signals W', $T_L'$, $T_H'$ which signals when Hi signify the detection of a wheeled, light tracked, or heavy tracked vehicle, respectively. Logic circuitry 63 comprises the two inverters 63A and 63B, and a further inverter 63C, the latter being connected to the threshold circuit 17 to receive the amplitude-threshold logic signal $T_H$. The logic circuitry 63 further comprises two AND gates 65A and 65B, the first AND gate 65A being connected at its two inputs one to inverter 63A, and the other, to receive logic signal $T_L$, the second AND gate 65B being connected at its two inputs one to inverter 63B and the other to receive logic signal $T_H$. The classification logic signals W', $T_L'$ and $T_H'$ are logically related to the amplitude threshold logic signals W, $T_L$, $T_H$ by the relations:

$$W' = W \cdot T_L; \quad T_L' = T_L \cdot T_H; \quad T_H' = T_H$$

Classification signal W' is Hi when the sensed signal Vs lies between the wheeled and the light tracked vehicle thresholds $V_W$ and $V_{TL}$. Similarly, classification signal $T_L'$ is Hi when the sensed signal Vs lies between the light and the heavy tracked vehicle thresholds $V_{TL}$ and $V_{TH}$, and $T_H'$ is Hi when the sensed signal Vs lies above the heavy tracked vehicle threshold $V_{TH}$.

The classification logic signals W', $T_L'$ and $T_H'$ and the direction logic signal LR are connected to the data inputs D of a latch 67. The clocking input CP of this latch is connected to the output of the monostable 59. When the validity signal H goes Hi, the inputs D are sampled and the outputs Q, $\overline{Q}$ of the latch 67 renewed. The outputs of the latch 67 are connected to display drivers 11 through an array of AND gates 69. Each of the AND gates 69 is also connected to the output of the monostable circuit 59. This enables display indication only for the duration of the pulse from the monostable.

The drivers 11 could be used to drive an LED light display to indicate vehicle direction (left-to-right, or right-to-left) and vehicle class (wheeled, light tracked, or heavy tracked).

Alternatively, a radio link could be used to relay indicator information to a remote display.

Operation of the directional seismic sensor system is now considered for a single light tracked vehicle moving from left to right along a monitored route. Particular reference is made to FIGS. 5 and 6(a) to (l).

As the vehicle approaches the geophones $G_A$ and $G_B$, the sensed signal Vs begins to increase in amplitude rising above the noise. On closer approach of the vehicle the sensed signal amplitude Vs rises above the lowest threshold $V_W$. At this point the amplitude-threshold logic signal W goes Lo [FIG. 6(a)] and causes the reset inputs CD and CD' of the flip-flop pairs 35A and 35B, 51A and 51B to go Lo, [FIGS. 6(f), 6(i)] setting the flip-flops. As the sensed signal Vs increases further, the intermediate threshold $V_{TL}$ is crossed causing the amplitude-threshold logic signal $T_L$ to go Lo [FIG. 6(b)] and the reset ports CD' of flip-flops to be pulsed Hi [FIG. 6(i)]. As the vehicle draws near to a closest point of approach equidistant from geophones $G_A$ and $G_B$, the phase signal P which initially is of negative amplitude, begins to increase rapidly and the lower phase-threshold, $-T$, is crossed. This causes the phase-threshold logic signal $\overline{P}_y$ to change state from Lo to Hi, [FIG. 6(d)], the counter reset input MR to go Lo, starting a timed countdown, [FIG. 6(e)], and flip-flop 35B to be triggered, driving output $Q_2$ Hi [FIG. 6(g)]. As the phase signal P increases in amplitude, the upper phase-threshold $+T$ is crossed and causes the phase-threshold logic signal $\overline{P}_x$ to change state from Hi to Lo [FIG. 6(c)]. The input ports of AND gate 37B are now both Hi and the output $A_2$ goes Hi [FIG. 6(g)]. The counter 45 is reset as the input MR now goes Hi [FIG. 6(e)]. Also as $A_2$ goes Hi, flip-flop 51B is triggered and the flip-flop output $Q_2'$ and the output $B_2$ of AND gate 53B both go Hi [FIGS. 6(j) and 6(k)]. Also as $B_2$ goes Hi, and is passed by OR gate 55 and AND gate 57, monostable 59 is activated and a validity pulse signal H generated [FIG. 6(l)]. The rising edge of this pulse triggers the latch 67 and the direction logic signal LR and the classification logic signals W', $T_L'$ and $T_H'$ are sampled. When sampled, direction logic signal LR is Lo and the $\overline{Q}$ output ($D_2$) of the latch is driven Hi. While the validity pulse remains Hi, this activates one of the drivers 11 and causes an LED to light up indicating transit of a detected vehicle from left to right. When sampled the classification logic signals W' and $T_H'$ are Lo but signal $T_L'$ is Hi and through latch 67 also causes an LED to light up, simultaneously, indicating the detected transit of a light tracked vehicle. After a short delay, the reset inputs CD of flip-flops 35A and 35B go Hi [FIG. 6(f)] and as these flip-flops are reset, the output $Q_2$, and the output $A_2$ of AND gate 37B, go Lo [FIGS. 6(g) and 6(h)]. The output $B_2$ of AND gate 53B also goes Lo [FIG. 6(k)]. Only later, when the sensed signal Vs falls below the wheeled threshold, $V_W$, and amplitude-threshold logic signal W goes Hi [FIG. 6(a)], so the reset inputs CD' of flip-flops 51A and 51B go Hi [FIG. 6(i)] and the output $Q_2'$ of flip-flop 51B go Lo [FIG. 6(j)].

Having particularly described the invention and the manner by which it is performed, I claim:

1. A system for the detection of moving objects, the system comprising:

a phase-sensitive circuit, responsive to two electrical input signals, for deriving a phase-sense signal that distinguishes a phase lead and a phase lag between these input signals;

an amplitude-sensitive circuit, responsive to at least one of the two electrical input signals, for comparing the peak amplitude of at least this one input signal against a first amplitude threshold of magnitude predetermined so to distinguish between electrical signals, that are characteristic of at least one class of moving object, from other electrical signals, and for deriving a first amplitude-threshold signal that is dependent on the outcome of this first comparison; and a processing circuit connected to both the phase-sensitive circuit to receive the phase-sense signal, and the amplitude-sensitive circuit to receive the amplitude-threshold signal, for providing an output signal indicating the detection of a moving object if, while said first amplitude threshold is exceeded, the phase-sense signal changes corresponding to a change in signal phase-sense, namely a change from a phase lead to a phase lag, or a change from a phase lag to a phase lead, between the two electrical input signals.

2. A system according to claim 1 in combination with a spaced pair of geophones, and a pair of matched passband filters intermediate the system and the pair of geophones, the geophones being responsive to vehicle seismic vibrations for producing the two electrical input signals, the geophones being deployed and separated by a distance not greater than one half of the upper-band wavelength characteristic of the filters.

3. A system according to claim 1 including direction sensitive means responsive to the phase-sense signal for deriving a direction sense signal dependent on the sense of change of the phase-sense signal as between a lead to lag change and a lag to lead change of the two electrical input signals.

4. A system according to claim 1 wherein the phase-sensitive circuit is arranged to provide a phase-sense signal having an amplitude dependent on the coherence of the two input signals and a sign dependent on the sense of the relative phase difference of these signals.

5. A system according to claim 4 wherein the phase-sensitive circuit includes at least one flip-flop responsive to the two electrical input signals, for deriving the phase-sense signal.

6. A system according to claim 4 wherein the phase-sensitive circuit includes a plurality of flip-flops responsive to the two electrical input signals, at least one inverter connected to receive one of the input signals, and connected to one of the inputs of at least one of the flip-flops, such that each flip-flop shall provide a different sample phase-sense signal; and, second summing means connected to the flip-flops to receive the sample phase-sense signals to produce as output a summed phase-sense signal.

7. A system for the detection of moving objects, the system comprising:

a phase-sensitive circuit, responsive to two electrical input signals, for deriving a phase-sense signal that is related to the relative phase difference between these input signals, the phase sensitive circuit being arranged to provide a phase-sense signal having an amplitude dependent on the coherence of the two input signals and a sign dependent on the sense of the relative phase difference of these signals;

an amplitude-sensitive circuit, responsive to at least one of the two electrical input signals, for comparing the peak amplitude of at least this one input signal against a first amplitude threshold of magnitude predetermined so to distinguish between electrical signals, that are characteristic of at least one class of moving object, from other electrical signals, and for deriving a first amplitude-threshold signal that is dependent on the outcome of this first comparison; and, a processing circuit connected to both the phase-sensitive circuit to receive the phase-sense signal, and the amplitude-sensitive circuit to receive the amplitude-threshold signal, for providing an output signal indicating the detection of a moving object if, while said first amplitude threshold is exceeded, the phase-sense signal changes corresponding to a change in lead-lag phase relationship between the two electrical input signals, the processing circuit including second comparator means for comparing the phase-sense signal against an upper and a lower amplitude threshold, and time-gating means for inhibiting indication of a moving object if said two phase-sense signal threshold levels are not crossed consecutively within an interval of time predetermined to distinguish those changes of the phase-sense signal that are characteristic of the pass of a moving object, from other changes in the phase-sense signal.

8. A system according to claim 7 wherein the processing circuit includes a memory circuit connected to the second comparator means to follow successive crossings of both the upper and lower amplitude thresholds, to provide inhibition of indication when successive crossings are of opposite sense, and to permit indication each time the next successive crossing is of the same sense whilst said first amplitude threshold is exceeded.

9. A system for the detection of moving objects, the system comprising:

a phase-sensitive circuit, responsive to two electrical input signals, for deriving a phase-sense signal that is related to the relative phase difference between these input signals;

an amplitude-sensitive circuit, responsive to at least one of the two electrical input signals, for comparing the peak amplitude of at least this one input signal against a first amplitude threshold of magnitude predetermined so to distinguish between electrical signals, that are characteristic of at least one class of moving object, from other electrical signals, and for deriving a first amplitude-threshold signal that is dependent on the outcome of this first comparison, the amplitude sensitive circuit having two input channels each for receiving a different one of the two electrical input signals, first summing means connected to each of said channels for providing a summed signal, and first comparator means connected to the first summing means to receive the summed signal and for comparing this signal with the first amplitude-threshold to derive the first amplitude-threshold signal; and, a processing circuit connected to both the phase-sensitive circuit to receive the phase-sense signal, and the amplitude-sensitive circuit to receive the amplitude-threshold signal, for providing an output signal indicating the detection of a moving object if, while said first amplitude threshold is exceeded, the phase-sense signal changes corresponding to a change in lead-lag phase relationship between the two electrical input signals.

10. A system for the detection and classification of moving objects, the system comprising:

a phase-sensitive circuit, responsive to two electrical input signals, for deriving a phase-sense signal that is related to the relative phase difference between these input signals;

an amplitude sensitive circuit responsive to at least one of the two electrical input signals; for comparing the peak amplitude of at least this one input signal against at least a first and a second amplitude-threshold, the amplitude sensitive circuit having a first reference means for providing a first amplitude-threshold reference to distinguish between signals of peak amplitude of the same peak amplitude or higher than the peak amplitude-threshold that is characteristic of one class of moving object from signals of lower peak amplitude, to derive a first amplitude-threshold signal; and, at least, a second reference means for providing a second amplitude reference to distinguish between signals of peak amplitude of the same peak amplitude or higher than the peak amplitude threshold that is characteristic of another class of moving object from signals of lower peak amplitude, to derive a second amplitude-threshold signal; and, a processing circuit connected to the phase-sensitive circuit to receive the phase-sense signal, and to the amplitude sensitive circuit to receive the amplitude-threshold signals, the processing circuit indicating the detection of the one class of moving object if when the phase-sense signal changes corresponding to a change in lead-lag relationship between the two electrical input signals, the first amplitude threshold only is exceeded, and indicating detection of another class of moving object, if while the phase-sense signal changes both the first and the second amplitude thresholds are exceeded.

11. A system according to claim 10 wherein the first reference means provides a first amplitude-threshold reference to distinguish signals corresponding to wheeled and tracked vehicles from signals of lower peak amplitude, and, the second reference means provides a second amplitude-threshold reference to distinguish signals corresponding tracked vehicles from signals corresponding to wheeled vehicles and other signals of lower peak amplitude.

12. A system according to claim 11 wherein the amplitude sensitive circuit includes a third reference means for providing a third amplitude threshold reference, to distinguish signals of high peak amplitude corresponding to heavy tracked vehicles, from signals of lower peak amplitude corresponding to light tracked vehicles, wheeled vehicles, and other signals of lower peak amplitude.

* * * * *